US006970870B2

(12) United States Patent
Dweck et al.

(10) Patent No.: US 6,970,870 B2
(45) Date of Patent: Nov. 29, 2005

(54) SYSTEMS AND METHODS FOR FACILITATING ACCESS TO DOCUMENTS VIA ASSOCIATED TAGS

(75) Inventors: Jay S. Dweck, Armonk, NY (US); Reha Elci, New York, NY (US); Wendy J. Moulton, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 390 days.

(21) Appl. No.: 10/016,674

(22) Filed: Oct. 30, 2001

(65) Prior Publication Data

US 2003/0084048 A1    May 1, 2003

(51) Int. Cl.$^7$ ............................................. G06F 17/30
(52) U.S. Cl. ........................... 707/10; 707/1; 707/100; 709/201; 709/203
(58) Field of Search ................... 707/1–10, 100–104.1, 707/501, 512, 516, 201; 395/193, 600, 774; 709/200–203

(56) References Cited

U.S. PATENT DOCUMENTS

| | | | |
|---|---|---|---|
| 5,408,655 A * | 4/1995 | Oren et al. ............... | 715/501.1 |
| 5,568,640 A | 10/1996 | Nishiyama et al. | |
| 5,737,739 A | 4/1998 | Shirley et al. | |
| 6,029,195 A | 2/2000 | Herz | |
| 6,055,543 A * | 4/2000 | Christensen et al. ..... | 707/104.1 |
| 6,067,552 A | 5/2000 | Yu | |
| 6,098,066 A | 8/2000 | Snow et al. | |
| 6,175,830 B1 | 1/2001 | Maynard | |
| 6,266,682 B1 * | 7/2001 | LaMarca et al. ......... | 715/501.1 |
| 6,282,547 B1 | 8/2001 | Hirsch | |
| 6,356,903 B1 * | 3/2002 | Baxter et al. ............... | 707/100 |
| 6,360,215 B1 | 3/2002 | Judd et al. | |
| 6,510,434 B1 * | 1/2003 | Anderson et al. ........... | 707/100 |
| 6,598,046 B1 * | 7/2003 | Goldberg et al. ............... | 707/5 |
| 2001/0016846 A1 | 8/2001 | Chakrabarti et al. | |
| 2001/0049675 A1 | 12/2001 | Mandler et al. | |
| 2002/0129062 A1 | 9/2002 | Luparello | |

OTHER PUBLICATIONS

"Tagging Concepts," www.SiteServer101.com (1999).
"Using Rules to Create Personalized Content," www.SiteServer101.com (1999).
Chandra Chekuri et al, "Web Search Using Automatic Classification," theory.stanford.edu (1996).
"Classification and Cataloging," www.nhse.org (1996).

* cited by examiner

Primary Examiner—Sam Rimell
Assistant Examiner—Mellissa M. Chojnacki
(74) Attorney, Agent, or Firm—Buckley, Maschoff & Talwalker LLC

(57) ABSTRACT

Systems and methods are provided to facilitate access to documents via associated tags. According to one embodiment, a first document tag is initially assigned to a document. For example, an author may review a document and indicate which document tag should be assigned to the document. An associated tag for the document is then automatically determined based on the first document tag. For example, a pre-determined tag association may be used to determine the associated tag based on the first document tag. The author may then review the associated tag to determine whether or not the associated tag should be also assigned to the document.

16 Claims, 14 Drawing Sheets

| TAG IDENTIFIER 702 | DESCRIPTION 704 | PARENT TAG 706 |
|---|---|---|
| T-A1(1) | AUTHOR - ANALYST | T-A0 |
| T-A1(2) | AUTHOR - INVESTMENT ADVISOR | T-A0 |
| T-A2(1) | AUTHOR - INVESTMENT ADVISOR - RICK SHERLUND | T-A1(1) |
| T-A2(2) | AUTHOR - INVESTMENT ADVISOR - JANE GREENE | T-A1(1) |
| T-I1(1) | INDUSTRY - TECHNOLOGY | T-I0 |
| T-I1(2) | INDUSTRY - AUTOMOTIVE | T-I0 |
| T-I2(1) | INDUSTRY - TECHNOLOGY - SOFTWARE | T-I1(1) |
| T-C4(7) | COMPANY - US - TECHNOLOGY - SOFTWARE - MICROSOFT | T-C3(2) |

| DOCUMENT IDENTIFIER 802 | DESCRIPTION 804 | PRIMARY TAGS 806 | SECONDARY TAGS 808 |
|---|---|---|---|
| D1001 | "MICROSOFT 2002 Q3" | T-A2(1); T-C4(7); T-R2(6); T-R3(2) | T-I2(1); T-T1(4) |
| D1002 | "FORECAST CHART" | T-A43(6); T-T1(5) | NONE |
| D1003 | "KEYNOTE ADDRESS (VIDEO)" | T-A31(73) | T-T5(23) |

900

| TAG ASSOCIATION IDENTIFIER 902 | TAG ASSOCIATION 904 |
|---|---|
| TA1001 | IF T-I2(1) IS A PRIMARY OR SECONDARY TAG, THEN T-I1(1) IS AN ASSOCIATED TAG |
| TA1002 | IF T-A2(1) IS A PRIMARY TAG, THEN T-C4(7) IS AN ASSOCIATED TAG |
| TA1003 | IF T-C4(7) IS A PRIMARY TAG, THEN T-A2(1) IS AN ASSOCIATED TAG |

FIG. 9

SYSTEMS AND METHODS FOR FACILITATING ACCESS TO DOCUMENTS VIA ASSOCIATED TAGS

FIELD

The present invention relates to systems and methods for facilitating access to documents. In particular, the present invention relates to systems and methods for facilitating access to documents via associated tags.

BACKGROUND

A content provider can store information that will be made available to content readers. For example, a financial company might store hundreds of thousands of documents (e.g., investment reports, stock charts, and market predictions) that will be made available to customers via a Web site.

The content provider may also want to provide a content reader with information that will likely be of interest to that particular content reader. For example, one content reader may be interested in accessing documents associated with one industry while another content reader is interested in accessing documents associated with another industry.

To facilitate a content reader's ability to access information that will likely be of interest, it is known that a content provider can categorize information. For example, a content provider can associate a document with one or more "key" words. Similarly, a content provider can categorize information such that documents associated with one category (e.g., an "Automotive Industry" category) are associated with one branch of a directory structure while documents associated with another category (e.g., an "Airline Industry" category) are associated with another branch. In this way, a content reader can navigate through the directory structure and locate information that will likely be of interest.

There are a number of disadvantages, however, with such an approach. For example, a content provider may not be able to review a large number of documents in order to determine how each document should be classified (e.g., when thousands of documents are generated each day). This may be particularly difficult when the documents are associated with investment research due to the large number of potential types of investments, the frequency at which this kind of information changes (e.g., daily, weekly, or occasionally), and the importance of providing such information to customers in a timely manner.

Moreover, a content provider may receive documents from a number of different content publishers (e.g., authors associated with different companies or different departments within a company)—and each of these content publishers may categorize information in different ways. As a result, it can be difficult to determine how documents received from a first content publisher relate to documents received from a second content publisher.

Another problem arises when a single document is associated with a number of different categories. For example, a market report might be associated with both a "Technology" category and an "Application Software" category. In this case, a content provider or content publisher could inadvertently fail to include the document in both categories. For example, an author might indicate that his or her market report is associated with the "Application Software" category without realizing that the market report should also be associated with the "Technology" category.

In addition, it is possible that a document will be closely related to some categories while only being somewhat related to other categories. In this case, it can be difficult to provide a content reader with information that is especially likely be of interest to that particular content reader. For example, a content reader who is only interested in receiving documents associated with a particular country could receive a large number of documents that are only somewhat related to that country.

SUMMARY

To alleviate problems inherent in the prior art, the present invention introduces systems and methods for facilitating access to documents via associated tags.

According to one embodiment, a first document tag is assigned to a document. An associated tag for the document is then automatically determined based on the first document tag.

According to another embodiment, an investment research document is received from a content publisher along with a first document tag associated with a single-rooted, hierarchical data structure. An associated tag for the document is then automatically determined based on the first document tag. An indication of the associated tag is transmitted to the content publisher, and a second document tag may be assigned to the investment research document based on an indication received from the content publisher. The investment research document is then retrieved in accordance with the second document tag and a reader tag, a request tag, and/or an entitlement tag. The retrieved investment research document is then transmitted to a content reader via a communication network.

According to another embodiment, a document is created and transmitted to a content controller along with an indication of a first document tag. An associated tag is received from the content controller, and an indication of whether or not a second document tag should be assigned to the document is transmitted to the content controller.

According to another embodiment, a pre-determined tag association is received and a first document tag for a document is retrieved. An associated tag for the document is then determined based on the pre-determined tag association and the first document tag.

According to still another embodiment, both a primary document tag and a secondary document tag are assigned to a document.

According to yet another embodiment, a first document tag is assigned to a document, and a second document tag is automatically assigned to the document based on the first document tag.

One embodiment comprises: means for assigning a first document tag to a document; and means for automatically determining an associated tag for the document based on the first document tag.

Another embodiment comprises: means for receiving an investment research document from a content publisher; means for receiving an indication of a first document tag from the content publisher, wherein the first document tag is associated with a single-rooted, hierarchical data structure; means for automatically determining an associated tag for the document based on the first document tag; means for transmitting an indication of the associated tag to the content publisher; means for receiving an indication from the content publisher; means for assigning a second document tag to the investment research document based on the associated tag and the received indication; means for retrieving the investment research document in accordance with the second document tag and at least one of: (i) a reader tag, (ii) a request tag, and (iii) an entitlement tag; and means for transmitting the retrieved investment research document to a content reader via a communication network.

Another embodiment comprises: means for creating a document; means for transmitting the document to a content controller along with an indication of a first document tag; means for receiving an associated tag from the content controller; and means for transmitting to the content controller an indication of whether or not a second document tag should be assigned to the document based on the associated tag.

Another embodiment comprises: means for receiving a pre-determined tag association; means for retrieving a first document tag for a document; and means for determining an associated tag for the document based on the pre-determined tag association and the first document tag.

Still another embodiment comprises: means for assigning a primary document tag to a document; and means for assigning a secondary document tag to a document.

Yet another embodiment comprises: means for means for assigning a first document tag to a document; and means for automatically assigning a second document tag to the document based on the first document tag.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 9 is a tabular representation of a portion of a tag association database according to one embodiment of the present invention.

DETAILED DESCRIPTION

Embodiments of the present invention are directed to systems and methods for facilitating access to "documents." As used herein, the term "document" may refer to any content that can be provided to a content reader via a communication network. A document may include, for example, text information, image information (e.g., photographic and video images), audio information, and/or executable information (e.g., a Java program). Note that a document's content could be manually or automatically created. For example, a document may be written by an author or generated by software program. In addition, a document's content could be associated with any type of information, including financial information (e.g., financial news and information about financial events), investment information, and/or market information.

Moreover, the phrase "content publisher" as used herein may be any person or device that generates or supplies documents. A content publisher may be associated with, for example, an author who writes a market summary or an automated process that generates investment charts. Similarly, the phrase "content reader" as used herein may be any person or device that receives documents. A content reader may be associated with, for example, a customer who accesses documents via an Internet portal. Note that a content "reader" may receive documents including any type of information described herein (e.g., a content reader may listen to audio information, view image information, and/or execute a Java program).

Content Management System Overview

Figure 1:
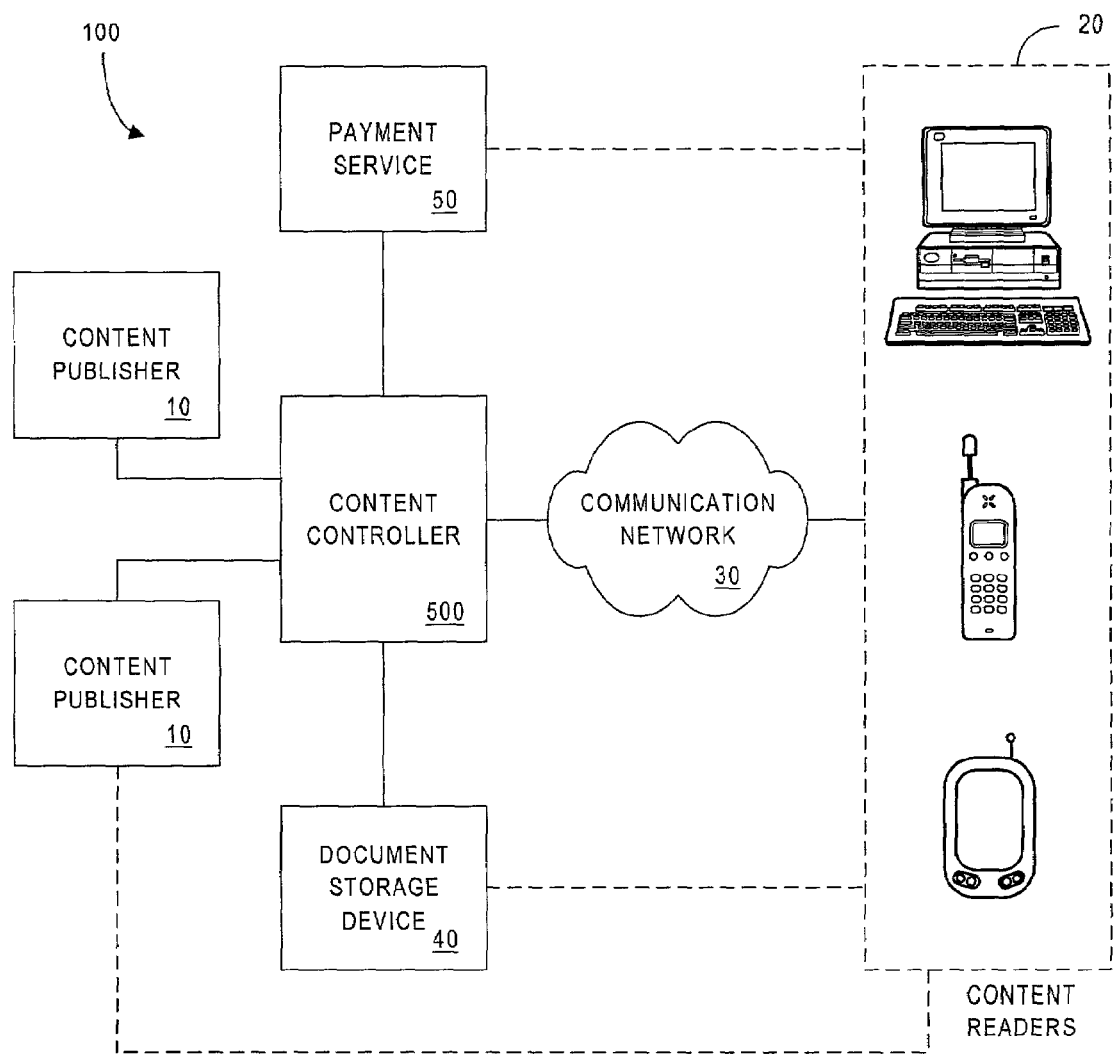
FIG. 1 is a block diagram overview of a content management system according to an embodiment of the present invention.

FIG. 1 is a block diagram of a content management system 100 according to one embodiment of the present invention. The content management system 100 includes a content controller 500 in communication with a number of content publishers 10 and content readers 20. As used herein, devices (e.g., the content controller 500 and the content readers 20) may communicate, for example, via a communication network 30, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network (e.g., in accordance with an 802.11 standard), and/or an Internet Protocol (IP) network such as the Internet, an intranet, or an extranet. Note that the content controller 500 and the content publishers 10 can also communicate via one or more such communication networks.

Although a single content controller 500 is shown in FIG. 1, any number of content controllers 500 may be included in the content management system 100. Similarly, any number of content publishers 10, content readers 20, or any other device described herein may be included in the content management system 100 according to embodiments of the present invention.

The content controller 500, the content publishers 10, and the content readers 20 may be associated with any devices capable of performing the various functions described herein. The content controller 500 may comprise, for example, a Web server. A content reader 20 may be associated with, for example: a Personal Computer (PC), a portable computing device such as a Personal Digital Assistant (PDA), a wired or wireless telephone, or any other appropriate storage and/or communication device. A content publisher 10 may be associated with, for example, a Web server or a PC.

The content management system 100 may also include a document storage device 40, such as a local, remote, or distributed database system adapted to store a large number of documents.

According to an embodiment of the present invention, the content controller 500 receives documents from the content publishers 10. For example, a content creator (e.g., an author or an automated process) may transmit documents to the content controller 500 via a content publisher 10. The content controller 500 also transmits documents to content readers 20 (e.g., in response to a customer's request or a pre-defined customer preference). According to some embodiments, a content reader 20 instead receives a document directly from a content publisher 10 and/or from the document storage device 40 (e.g., after receiving a relevant document identifier or link from the content controller 500). In either case, a document may be transmitted to a content reader 20, for example, via a Web site or an electronic mail message.

The content management system 100 may also include a payment service 50 (e.g., a credit card payment service) that can be used to arrange for a content reader 20 to provide payment in exchange for documents or in exchange for having his or her access to documents facilitated via the content management system 100. For example, a content reader 20 may provide a monthly subscription payment via a payment identifier such as a credit card, debit card, or bank account number or digital payment protocol information.

Note that some of devices illustrated in FIG. 1 may actually be incorporated in a single device. For example, the content controller 500 may also act as a content publisher 10 and/or a document storage device 40.

Document Tagging Method

Figure 2:
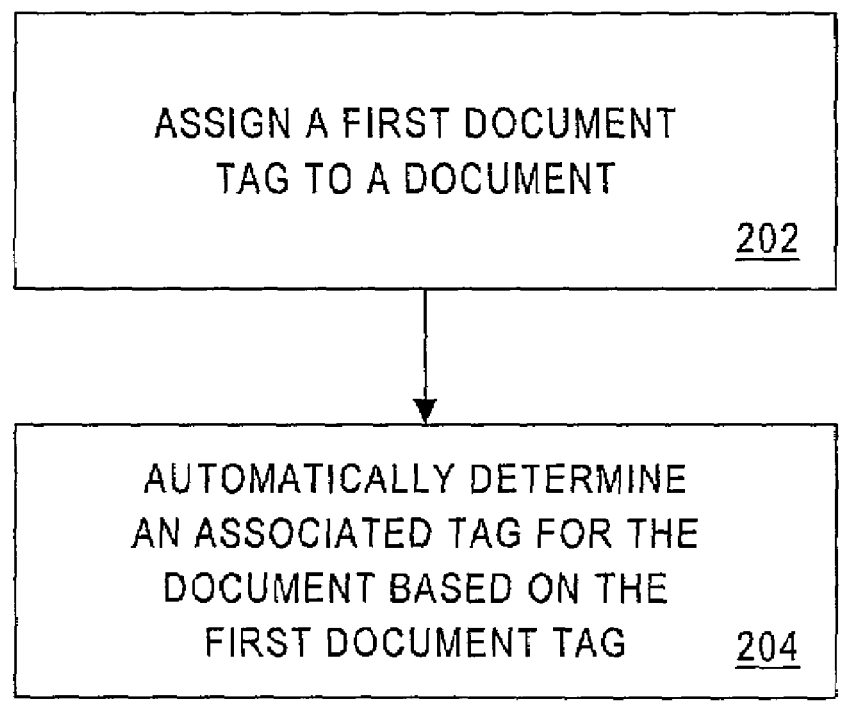
FIG. 2 is a flow chart of a method according to some embodiments of the present invention.

FIG. 2 is a flow chart of a method that may be performed by the content controller 500 according to some embodiments of the present invention. The flow charts described herein do not imply a fixed order to the steps, and embodiments of the present invention may be practiced in any order that is practicable.

At 202, a first document "tag" is assigned to a document. As used herein, the term "tag" refers to any information, such as an identifier, that may be used to categorize or otherwise provide information about a document.

Figure 3:
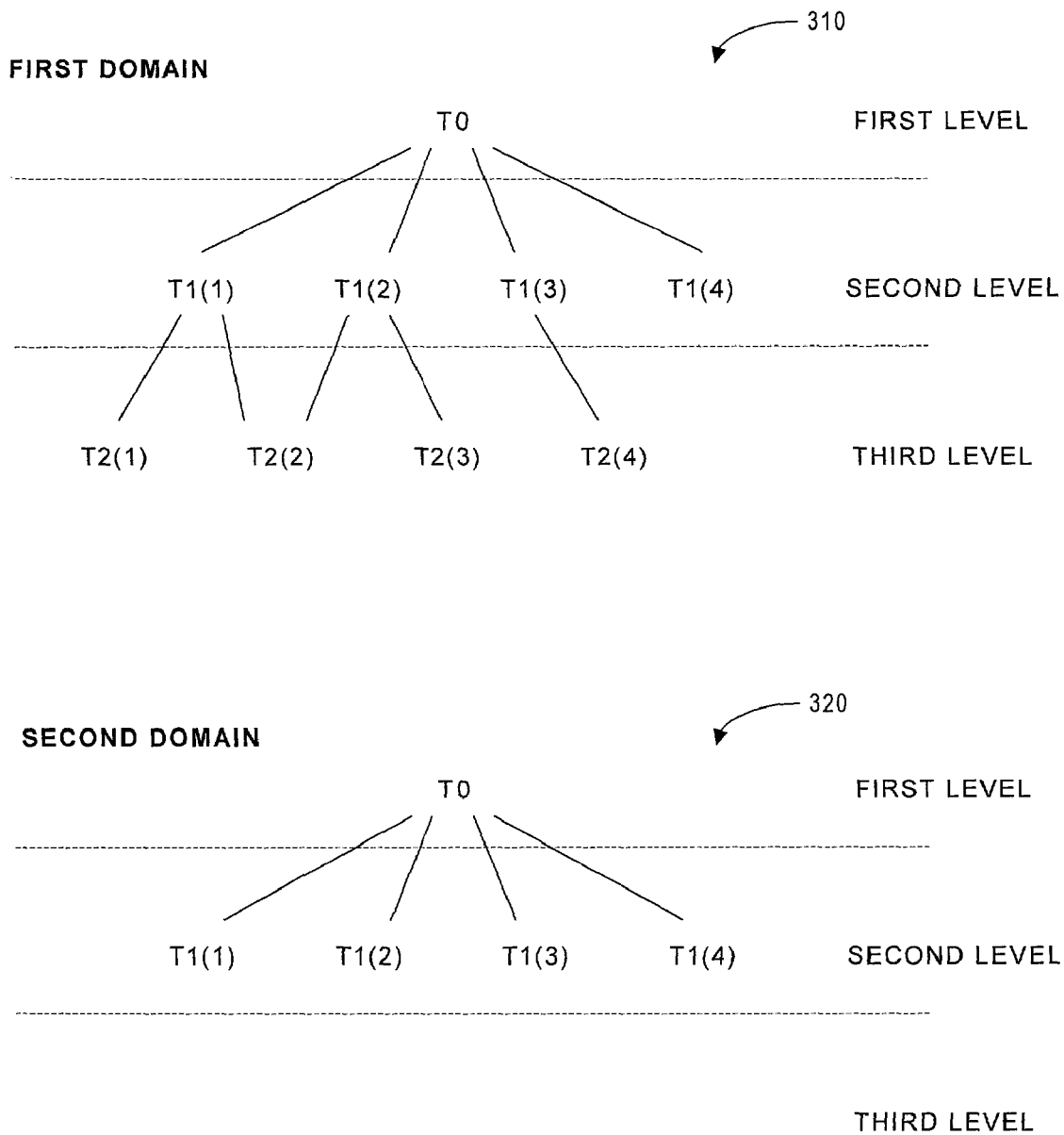
FIG. 3 illustrates tag domains according to some embodiments of the present invention.

According to one embodiment, a document tag is associated with a tag "domain," such as a single-rooted, hierarchical data structure. FIG. 3 illustrates two tag domains 310, 320 according to some embodiments of the present invention. As can be seen, the first tag domain 310 includes three levels. The first level includes a single tag (i.e., tag "T0") that has four descendent tags (i.e., child tags) in the second level: T1(1), T1(2), T1(3), and T1(4). Moreover, some of those second level tags have children in the third level. For example, tag T1(1) has two child tags in the third level: T2(1) and T2(2). Note that a tag may have more than one antecedent tag (e.g., a parent tag). For example, tag T2(2) has both tag T1(1) and tag T1(2) as parent tags. In addition, a tag may not have any child tags. For example, tag T1(4) in the second level does not have any child tag in the third level.

As another example, the second tag domain 320 is "flat." That is, the entire domain consists of a single parent tag (i.e., tag "T0") and a number of child tags.

Although generic document tags are shown in FIG. 3, a document tag may be associated with any type of information that can be used to categorize documents. For example, a tag domain may be associated with a document's creator (e.g., an author or an automated process). Consider the second tag domain 320 illustrated in FIG. 3. In this case, each tag in the second level could be associated with a different creator. Similarly, a document tag may be associated with a date on which a document's content was created. As another example, a document tag may indicate a content type. For example, a document tag may indicate whether a document was automatically generated or manually written by an author. A document tag might instead indicate whether a document includes image information or whether a document is appropriate for handheld content readers 20.

A document tag may also indicate the nature of a document's content. For example, a tag may indicate that a document is related to a particular sector (e.g., the technology sector), an industry (e.g., the German automotive industry), a research type, a company (e.g., MICROSOFT CORP.®), an issuer, a region (e.g., North America), a country (e.g., Canada), an investment product, a security instrument, a third-party rating (e.g., a Moody's Investors Service rating), a research analyst, a strategist, an event type (e.g., an investor conference call), a subject, an investment style (e.g., value-based investing), a market cap, a document type, an information value, and/or a currency.

A document tag may also reflect other information about a document. For example, a document tag may indicate a change frequency (e.g., how often the document is normally updated), a business owner, a technology owner, a data source (e.g., a database identifier), and/or a change process (e.g., indicating that any change must be approved by the appropriate business owner).

Referring again to FIG. 2, the content controller 500 may assign the first document tag after receiving a document from a content publisher 10 along with an indication of an appropriate document tag. That is, the content publisher 10 (or a tag assignor associated with the content publisher 10) may determine the appropriate document tag (e.g., by selecting one or more tag descriptions via a graphical data structure). In this case, the content controller 500 can simply assign the first document tag to the document based on indication received from the content publisher 10.

According to another embodiment, the content controller 500 does not receive an indication of an appropriate document tag from the content publisher 10. In this case, the content controller 500 may determine the first document tag. For example, a tag assignor associated with the content controller 500 may review the document to determine the first document tag. According to another embodiment, an automated process is used to automatically determine the first document tag (e.g., based on a keyword analysis of the document's content). Similarly, a document received from a particular content publisher may automatically be assigned a particular document tag.

Note that when documents are received from different content publishers 10, different methods may be used to determine document tags (e.g., some content publishers 10 may provide appropriate document tags to the content controller 500 while others do not).

According to one embodiment, a document tag can be associated with a document in different ways. For example, a document tag may be designated as a "primary" tag (e.g., indicating that the tag is an important subject of the document) or a "secondary" tag (e.g., indicating that tag is only somewhat related to the document).

Note that a plurality of document tags can be assigned to a single document, and these tags may belong to one or more tag domains. For example, a single document tag from an author tag domain (e.g., a "Rick Sherlund" tag) and three document tags from an industry tag domain (e.g., "Technology," "Software," and "Operating Systems" tags) could be assigned to a particular document.

At 204, an "associated" tag is automatically determined based on the first document tag. For example, the content controller 500 may automatically determine the associated tag based on the first document tag and a pre-determined tag association (e.g., a pre-determined tag association rule). Consider a document whose author indicates that the document should be assigned a "United States" region tag. In this case, the content controller 500 may automatically determine that "North America" is an appropriate associated tag.

The tag association might be associated with another tag in the first document tag's domain. For example, when the first document tag is from an investment product tag domain, a parent, a sibling, and/or a child tag from the investment product domain could become the associated tag.

The associated tag may instead belong to a different tag domain (e.g., when the first document tag indicates a particular product, an appropriate tag from a company tag domain could become the associated tag). The tag association may also include a start date and/or an end date. For example, some tag associations may be retroactive (e.g., and will impact documents created before the tag association) while others are not. Note that the tag association itself may be manually created (e.g., by an administrator associated with the content controller 500) or automatically generated (e.g., based on a history of document tags suggested or accepted by content publishers).

The content controller 500 may determine the associated tag based on primary and/or secondary tags. For example, the content controller 500 may determine the associated tag regardless of whether the first document tag is a primary or secondary tag. According to another embodiment, the content controller 500 determines the associated tag only if the first document tag is a primary tag (e.g., because any relationship between the associated tag, the secondary tag, and the document's content may be too tenuous). Note that different tag associations could use primary and secondary tags in different ways.

According to one embodiment, the content controller 500 assigns a second document tag to the document based on the associated tag. For example, the content controller 500 may transmit an indication of the associated tag to an author who wrote the document. The author could then review the associated tag and determine if the associated tag should be used as a primary or secondary tag. Of course, the author might instead determine that the associated tag should be ignored entirely.

According to one embodiment, the content controller 500 reviews the primary and secondary tags that have already been selected by a content publisher 10 (along with any associated tags that the content publisher has not accepted) before transmitting an indication of an associated tag to the content publisher. That is, the content controller 500 may avoid sending redundant indications of associated tags to a content publisher 10.

The content controller 500 then receives an appropriate response from the content publisher 10 (e.g., by receiving a "make primary," "make secondary," or "ignore" indication from an author). Based on this response, the content controller 500 can assign an appropriate primary or secondary tag to the document. According to another embodiment, the content controller 500 instead automatically assigns a primary or secondary tag to the document (e.g., an associated tag may always become a secondary tag without any input from the author).

Note that the content controller 500 may determine a number of different associated tags for a single document. For example, a single document may have five primary tags and ten secondary tags, from which four associated tags are determined. Also note that a single primary or secondary tag could result in a number of different associated tags.

The content controller 500 can then store the document along with the appropriate primary and secondary tags, and a content reader 20 can request to receive documents associated with a particular tag (e.g., by asking to receive all documents that have "MICROSOFT CORP.®" as a document tag). That is, the content controller 500 can retrieve appropriate documents based on the stored primary and secondary tags.

Note that a content reader may request to receive a document via the same hierarchical data structure that was used by the content controller 500 to categorize the documents (e.g., via one or more tag domains). That is, reader tags (e.g., associated with a particular content reader's preferences), request tags (e.g., associated with a particular request from a content reader), and/or entitlement tags (e.g., associated with a content reader's ability to access information) may be used to determine which documents should be provided to a content reader. Once the appropriate documents have been identified, they can be transmitted from the content controller 500 to a content reader 20 via a communication network.

Example

Figure 4:
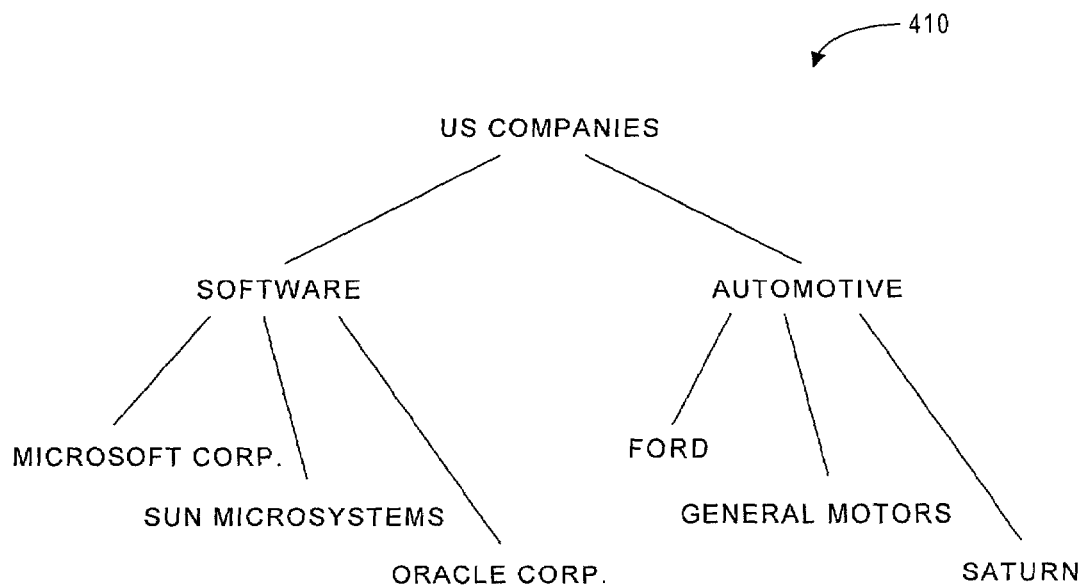
FIG. 4 illustrates an example of tag domains according to one embodiment of the present invention.
Figure 4:
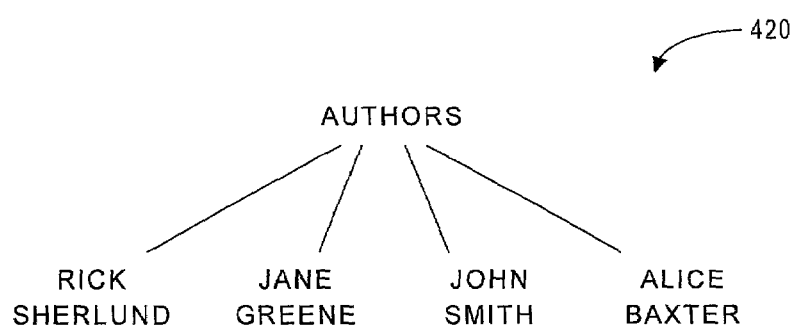

FIG. 4 illustrates an example of tag domains 410, 420 according to one embodiment of the present invention. As can be seen, the first tag domain 410 comprises a "US Companies" tag having "Software" and "Automotive" as child tags. Moreover, the "Software" tag has "MICROSOFT CORP.®," "SUN MICROSYSTEMS®," and "ORACLE CORP.®" as child tags. The second tag domain 420 comprises an "Authors" tag having four child tags. Although only a small number of tags are shown in FIG. 4, any number of tags may be defined by the content controller 500.

For the sake of example, assume that the following tag association has been defined: When "Rick Sherlund" is a primary or secondary tag, then "MICROSOFT CORP.®" is an associated tag.

Rick Sherlund then writes a brief analysis of MICROSOFT CORP.® and submits the analysis to the content controller 500 via his content publisher 10 (e.g., by using his PC to submit the analysis via an intranet). As part of the submission process, the author is asked to assign primary and/or secondary tags to the analysis. In this case, he indicates that "Rick Sherlund" should be a primary tag (this process may of course be automated) and that "US COMPANIES" should be a secondary tag.

Based on the primary tag and the pre-defined tag association, the content controller 500 determines that "MICROSOFT CORP.®" is an associated tag (e.g., because "Rick Sherlund" is a primary tag). The content controller 500 then asks the author if "MICROSOFT CORP.®" should become a primary tag, become a secondary tag, or not become a document tag at all. He indicates that "MICROSOFT CORP.®" should be added as another primary tag, and the content controller 500 stores the analysis and along with the appropriate documents tags (i.e., including both "MICROSOFT CORP.®" and "Rick Sherlund" as primary tags). This information can then be accessed when a reader requests, for example, all documents that were written by Rick Sherlund and that have "MICROSOFT CORP.®" as a primary tag.

Content Controller

Figure 5:
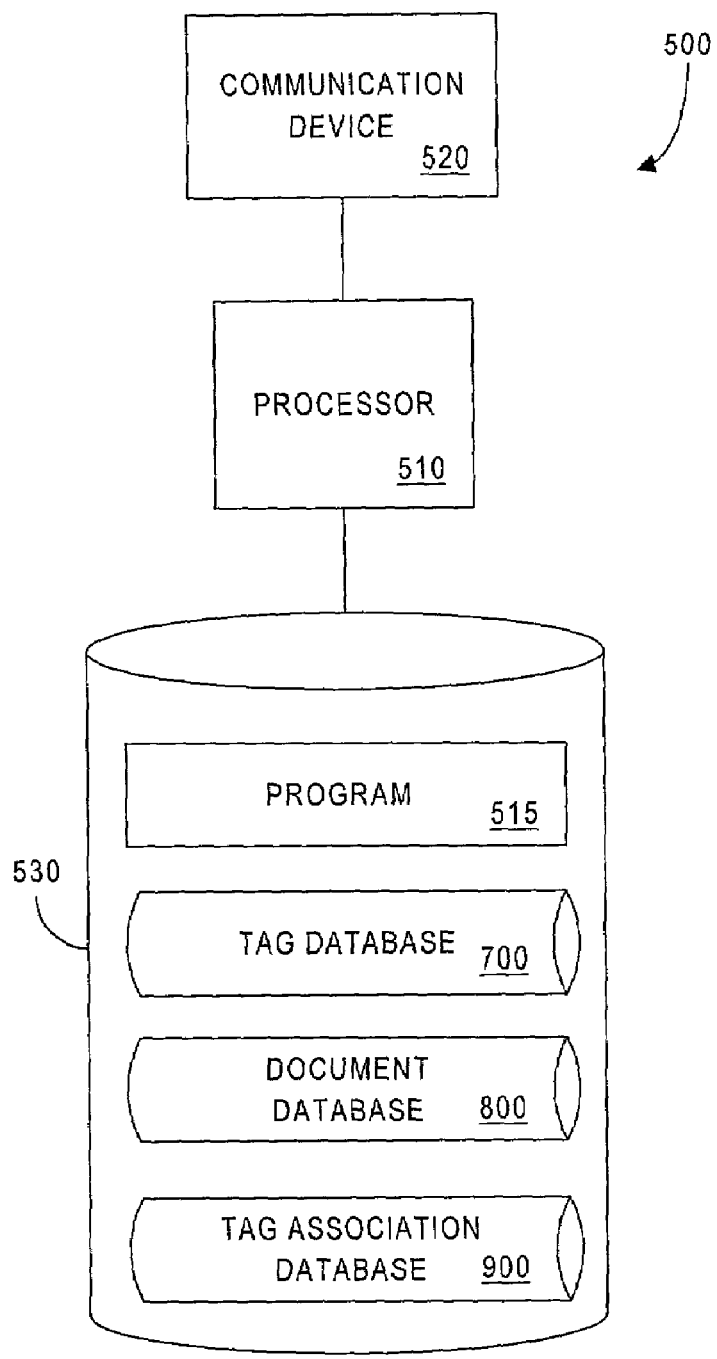
FIG. 5 is a block diagram of a content controller according to one embodiment of the present invention.

FIG. 5 illustrates a content controller 500 that is descriptive of the device shown, for example, in FIG. 1 according to an embodiment of the present invention. The content controller 500 comprises a processor 510, such as one or more INTEL® Pentium® processors, coupled to a communication device 520 configured to communicate via a communication network 30 (not shown in FIG. 5). The communication device 520 may be used to communicate, for example, with one or more content publishers 10, content readers 20, document storage devices 40, and/or payment services 50. According to one embodiment, the communication device 520 is also used to communicate with other content controllers.

The processor 510 is also in communication with a storage device 530. The storage device 530 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 530 stores a program 515 for controlling the processor 510.

The processor 510 performs instructions of the program 515, and thereby operates in accordance with the present invention. For example, the processor 510 may assign a first document tag to a document. The processor 510 may then automatically determine an associated tag for the document based on the first document tag.

According to another embodiment, the processor 510 receives an investment research document from a content publisher along with an indication of a first document tag associated with a single-rooted, hierarchical data structure. The processor 510 then automatically determines an associated tag for the document based on the first document tag and transmits an indication of the associated tag to the content publisher. An indication is received from the content publisher, and the processor 510 may assign a second document tag to the investment research document based on the associated tag and the received indication.

Figure 6:
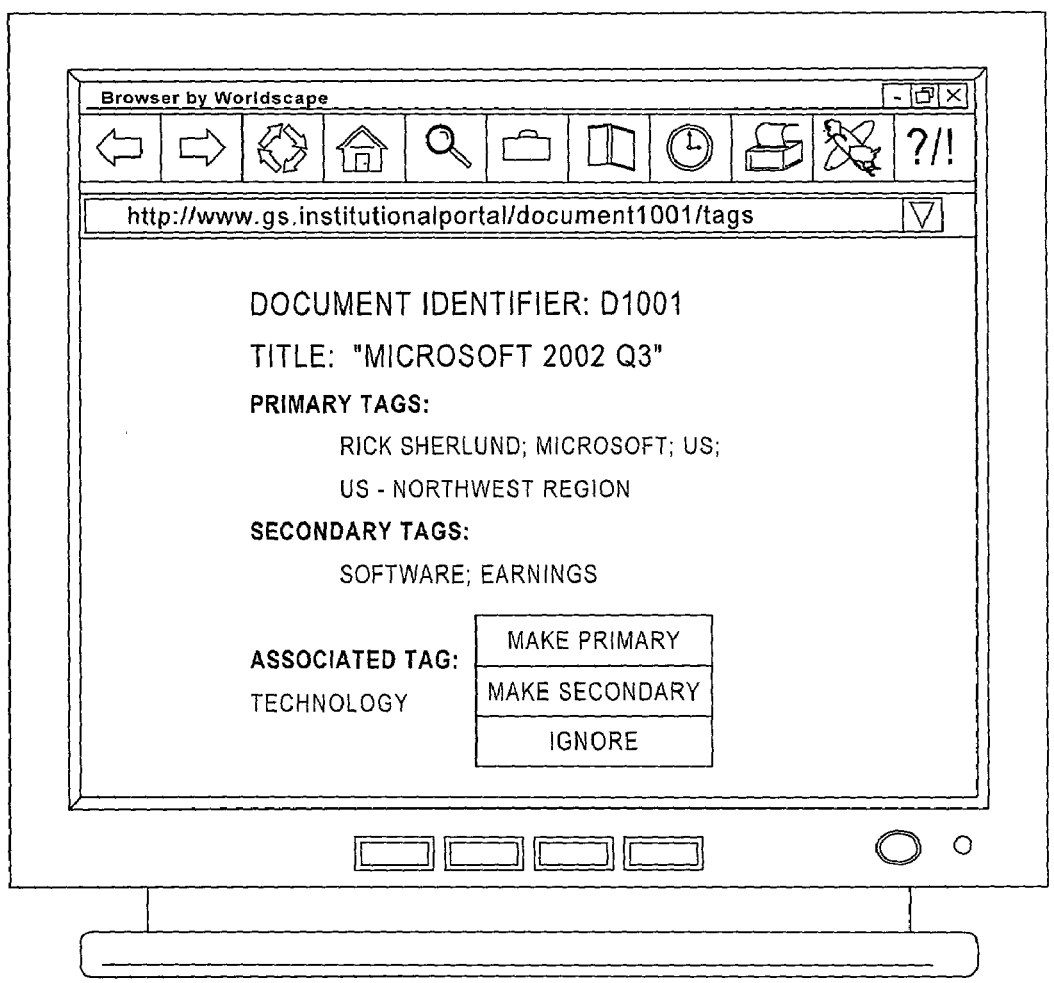
FIG. 6 illustrates a content publisher display according to some embodiments of the present invention.

For example, FIG. 6 illustrates a display 12 that may be provided to a content publisher 10. In this case, the processor 510 has determined that a "Technology" associated tag is related to a document entitled "Microsoft 2002 Q3." The content publisher 10 may then indicate that "Technology" should become a primary tag (i.e., "make primary), become a secondary tag (i.e., "make secondary"), or not become a document tag at all (i.e., "ignore").

The investment research document is later retrieved in accordance with the second document tag and a reader tag, a request tag, and/or an entitlement tag. The processor 510 can then transmit the retrieved investment research document to a content reader 20 via a communication network.

As used herein, information may be "received" by or "transmitted" to, for example: (i) the content controller 500 from a content publisher 10 or a content reader 20; or (ii) a software application or module within the content controller 500 from another software application, module, or any other source.

As shown in FIG. 5, the storage device 530 also stores: a tag database 700 (described with respect to FIG. 7); a document database 800 (described with respect to FIG. 8); and a tag association database 900 (described with respect to FIG. 9). Examples of databases that may be used in connection with the content management system 100 will now be described in detail with respect to FIGS. 7 through 9. The illustrations and accompanying descriptions of the databases presented herein are exemplary, and any number of other database arrangements could be employed besides those suggested by the figures.

Tag Database

Figure 7:
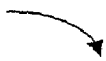
FIG. 7 is a tabular representation of a portion of a tag database according to one embodiment of the present invention.

Referring to FIG. 7, a table represents the tag database 700 that may be stored at the content controller 500 according to an embodiment of the present invention. The table includes entries identifying document tags that can be associated with a document (e.g., as a primary tag, a secondary tag, and/or an associated tag). The table also defines fields 702, 704, 706 for each of the entries. The fields specify: a tag identifier 702, a description 704, and a parent tag 706. The information in the tag database 700 may be created and updated based on information received from an administrator associated with the content controller 500.

The tag identifier 702 may be an alphanumeric code that can be associated with a document, and the description 704 may describe the meaning of the tag. According to one embodiment, the description 704 includes text, graphical, and/or audio information that is provided to a tag assignor via a content publisher 10 or the content controller 500 (e.g., to help the assignor select one or more appropriate tags for a document). The parent tag 706 indicates the parent or parents of the tag in a hierarchical data structure.

Note that the tag identifier 702 may be based on the tag's position in the hierarchical data structure. Consider for example, a tag domain associated with document authors. In this case, each tag identifier may begin with "T-A" followed by a number representing a level within the author tag domain. Similarly, tag identifiers in an industry tag domain may begin with "T-I," and tag identifiers in a company tag domain may begin with "T-C."

Moreover, the first level of the author tag domain may consist of a single "T-A0" tag identifier (e.g., with "0" representing the first level). The "T-A1(1)" tag identifier associated with "Author—Analyst" (as shown by the first entry in FIG. 7) would then be a child of the "T-A0 tag" identifier in the second level (e.g., as reflected by the parent tag 706). Similarly, the "T-A2(1)" tag identifier associated with "Author—Analyst—Rick Sherlund" is a child of the "T-A1(1)" tag identifier. Of course, any number of other methods may be used instead to indicate a tag's position in one or more one or more tag domains and/or tag domain levels.

Document Database

Figure 8:
FIG. 8 is a tabular representation of a portion of a document database according to one embodiment of the present invention.

Referring to FIG. 8, a table represents the document database 800 that may be stored at the content controller 500 according to an embodiment of the present invention. The table includes entries identifying documents that may be accessed via the content management system 100. The table also defines fields 802, 804, 806, 808 for each of the entries. The fields specify: a document identifier 802, a description 804, primary tags 806, and secondary tags 808. The information in the document database 800 may be created and updated based on information received from content publishers 10.

The document identifier 802 may be, for example, an alphanumeric code associated with a document that can be accessed via the content management system 100. The description 804 may describe the contents of the document. According to one embodiment, the description 804 includes text, graphical, and/or audio information that may be provided to a customer via a content reader 20 (e.g., to describe the content of the document to a content reader). According to another embodiment, the document itself (or a pointer to the document) is also stored in the document database 800.

The primary tags 806 and the secondary tags 808 reflect the document tags that are currently assigned to the document. Note that the primary tags 806 and the secondary tags 808 may be based on, or associated with, the tag identifiers stored 702 in the tag database 700. Also note that some of the primary tags 806 and secondary tags 808 may have resulted from an associated tag that was identified by the content controller 500 (e.g., based on other tags that were associated with the document) and approved by a content publisher or tag assignor.

According to one embodiment, only a single set of document tags are stored for each document (e.g., there is no distinction between "primary" and "secondary" tags). According to another embodiment, each document tag is associated with a "weight." For example, a weight from 1 through 10 may be assigned to each document tag (instead of only categorizing document tags as primary or secondary).

Tag Association Database

Referring to FIG. 9, a table represents the tag association database 900 that may be stored at the content controller 500 according to an embodiment of the present invention. The table includes entries identifying pre-determined tag associations. The table also defines fields 902, 904 for each of the entries. The fields specify: a tag association identifier 902 and a tag association 904. The information in the tag association database 900 may be created and updated, for example, based on information received from an administrator associated with the content controller 500.

The tag association identifier 902 may be, for example, an alphanumeric code associated with a pre-determined tag association 904. The tag association 904 may comprise, for example, any meta-level knowledge about a tag, such as a tagging rule (e.g., "if X then Y").

For example, as illustrated by the second entry in FIG. 9, if "T-A2(1)" is a primary tag then "T-C4(7)" is an associated tag. Such a rule might mean, by way of example, that whenever "Author—Investment Advisor—Rick Sherlund" is a primary tag "MICROSOFT CORP.®" will become an associated tag. As a result, when a document is received having "Author—Investment Advisor—Rick Sherlund" as a primary tag, then an author may be asked whether or not "MICROSOFT CORP.®" should be also be added as a primary or secondary tag.

According to another embodiment, tag associations are instead stored in the tag database 700. That is, a list of "associated tags" can be stored for each tag identifier 702 (and those associated tags can always become an associated tag when that tag identifier 702 is either a primary or secondary tag).

Content Management System Methods

Figure 10:
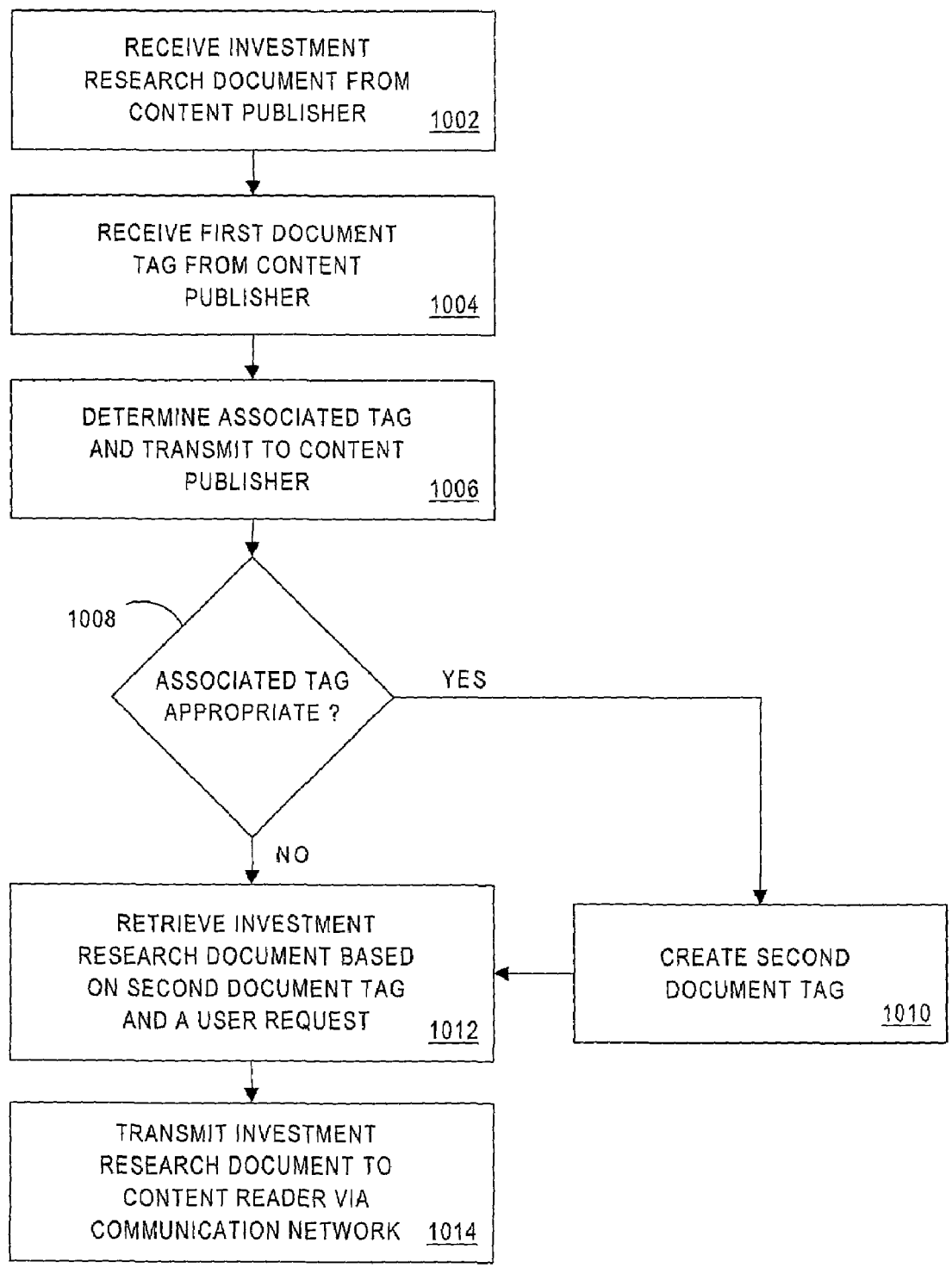
FIG. 10 is a flow chart of a computer-implemented method of facilitating access to investment research documents according to some embodiments of the present invention.

FIG. 10 is a flow chart of a computer-implemented method of facilitating access to investment research documents according to some embodiments of the present invention. The method may be performed, for example, by the content controller 500. At 1002, an investment research document is received from a content publisher 10. For example, the content controller 500 may receive the investment research document from an author.

At 1004, an indication of a first document tag is received from the content publisher 10. For example, the content controller 500 may receive a document tag associated with a single-rooted, hierarchical data structure from the author (e.g., in accordance with the tag database 700 structure). The document tag may then be stored as a primary tag 806 or a secondary tag 808 in the document database 800.

An associated tag is then automatically determined for the document based on the first document tag at 1006. For example, the content controller 500 may use tag associations 904 in the tag association database 900 to determine one or more associated tags.

An indication of the associated tag is then transmitted to the content publisher 10. For example, the content controller 500 may transmit an indication of the associated tag to the author. A response may then be received from the content publisher 10. For example, the author may use a display 12 such as the one shown in FIG. 6 to provide an indication to the content controller 500 (e.g., indicating "make primary," "make secondary," or "ignore").

If the associated tag was appropriate at 1008, a second document tag is created for the investment research document at 1010. For example, if the indication was "make primary" or "make secondary," the content controller 500 would store the associated tag in the document database 800 as a primary tag 806 or a secondary tag 808, respectively.

At 1012, the investment research document is retrieved in accordance with the second document tag and a reader request. For example, the content controller 500 may receive from a content reader 20 a request for all investment research documents that have a particular tag. The content controller 500 would then review the primary tags 806 and secondary tags 808 in the document database 800 to determine which investment research documents should be retrieved in response to the reader request. The retrieved investment research document or documents are then transmitted to a content reader 20 via a communication network at 1014.

Figure 11:
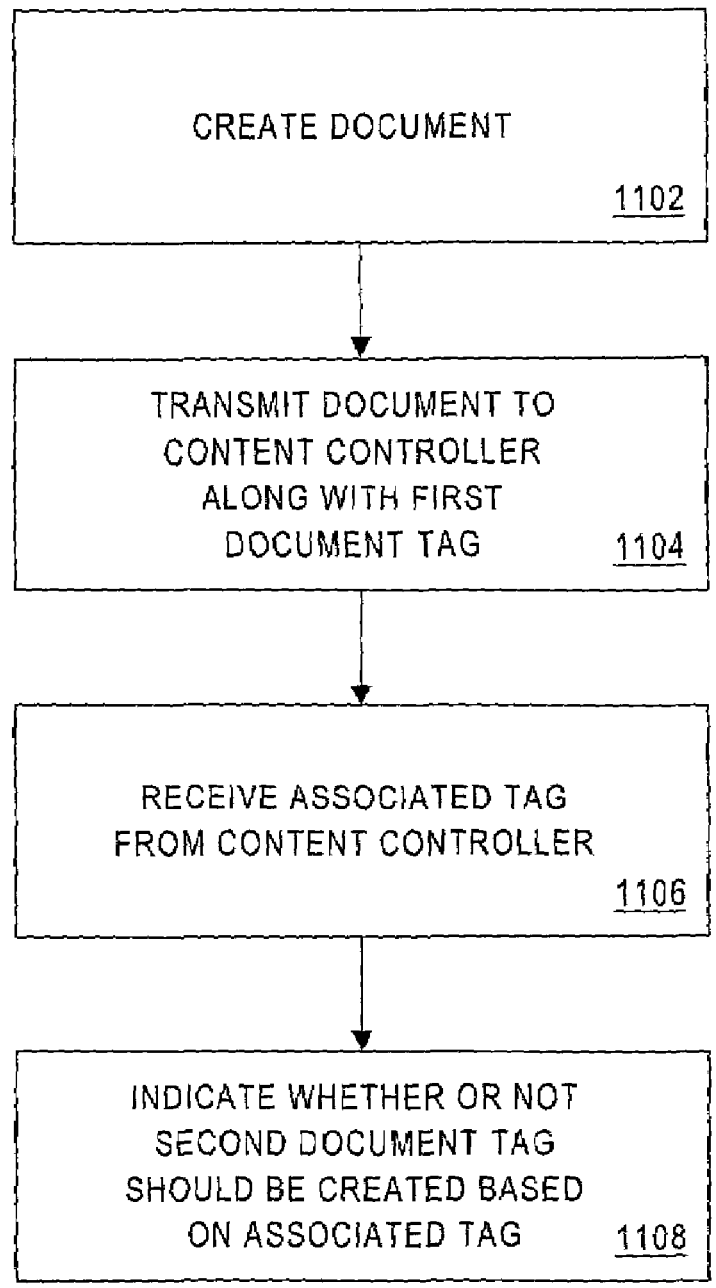
FIG. 11 is a flow chart of a document creation method according to some embodiments of the present invention.

FIG. 11 is a flow chart of a document creation method according to some embodiments of the present invention. The method may be performed, for example, by an author via a content publisher 10. At 1102, a document is created. For example, an author or an automated process may create a document containing text, images, audio, and/or executable information. The document is then transmitted to a content controller 500 along with an indication of a first document tag. For example, an author may select one or more document tags from a graphical representation of tag domain hierarchies.

At 1106, an associated tag is received from the content controller 500, and an indication of whether or not a second document tag should be assigned to the document based on the associated tag is returned to the content controller 500 at 1108. For example, an author may use a display 12 such as the one shown in FIG. 6 to indicate whether or not an associated tag should become a primary or secondary tag.

Figure 12:
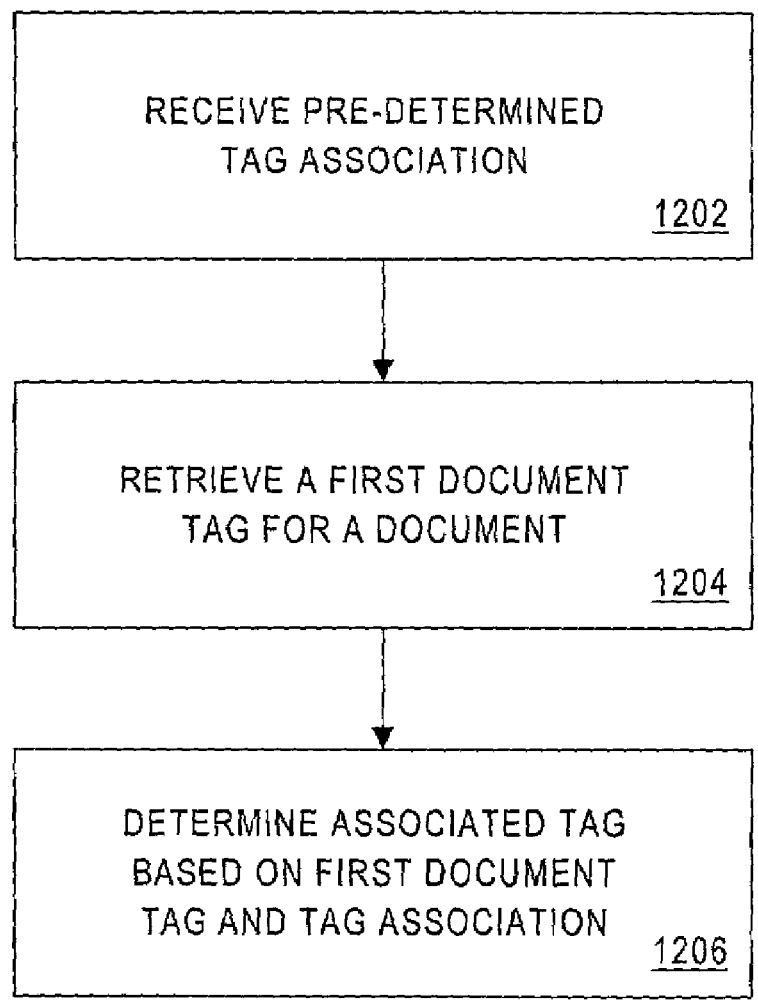
FIG. 12 is a flow chart of a method according to another embodiment of the present invention.

FIG. 12 is a flow chart of a method according to another embodiment of the present invention. The method may be performed, for example, by the content controller 500 when a number of "legacy" documents need to be evaluated (or re-evaluated). As used herein, a legacy document may be, for example, a document that was created before one or more tag domains or associations were established or adjusted.

At 1202, a tag association is received. For example, the content controller 500 may receive a tag association rule from an administrator and store the rule in the tag association database 900.

At 1204, a first document tag is retrieved for a document. For example, the content controller 500 may retrieve a primary tag 806 or a secondary tag 808 from the document database 800. At 1206, an associated tag for the document is then determined based on the first document tag and the tag association.

Consider, for example, a document database 800 that already contains thousands of legacy documents when a new tag association is created (or when a prior tag association is deleted or adjusted). In this case, the content controller 500 may review all of the primary tags 806 and secondary tags 808 in the document database 800 in light of the new tag association (e.g., to ask authors if new primary tags 806 and secondary tags 808 should be created).

Consider now a set of legacy documents for which primary tags 806 and secondary tags 808 were never created. In this case, the content controller 500 may use a tag translation rule to convert any information that is available about the legacy documents into primary tags 806 and/or secondary tags 808 (e.g., by translating an author's name into an author tag domain). Similarly, the content controller 500 may use a content evaluation process (e.g., a keyword analysis) to create primary tags 806 and/or secondary tags 808 prior to executing tag associations.

Figure 13:
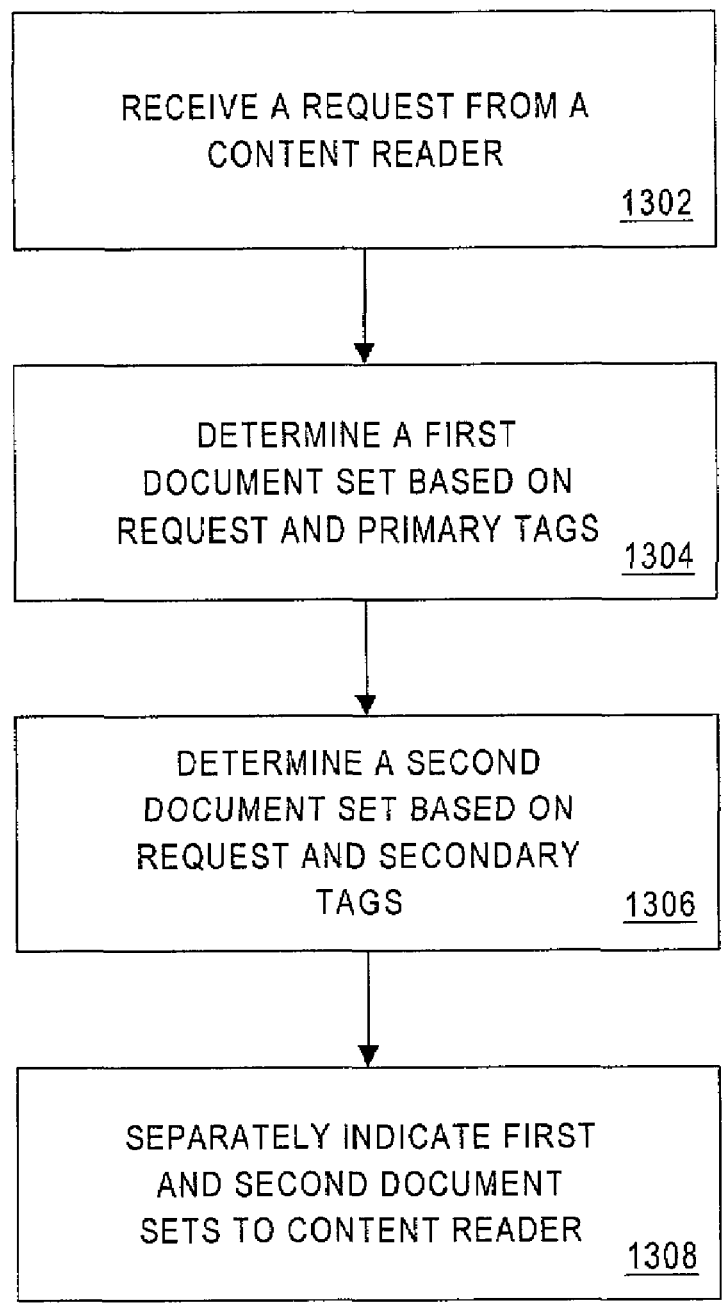
FIG. 13 is a flow chart of a method to provide documents according to some embodiment of the present invention.

FIG. 13 is a flow chart of a method to provide documents according to some embodiment of the present invention. The method may be performed, for example, by the content controller 500. At 1302, a request is received from a content reader 10. For example, a person may access use a Web portal and transmit to the content controller 500 a request for investment research documents that are associated with a particular company.

At 1304, a first document set is determined based on the request and primary tags. For example, the content controller 500 may generate the first document set based on the document identifiers 802 and primary tags 806 stored in the document database 800.

At 1306, a second document set is determined based on the request and secondary tags. For example, the content controller 500 may generate the second document set based on the document identifiers 802 and secondary tags 808 stored in the document database 800.

Figure 14:
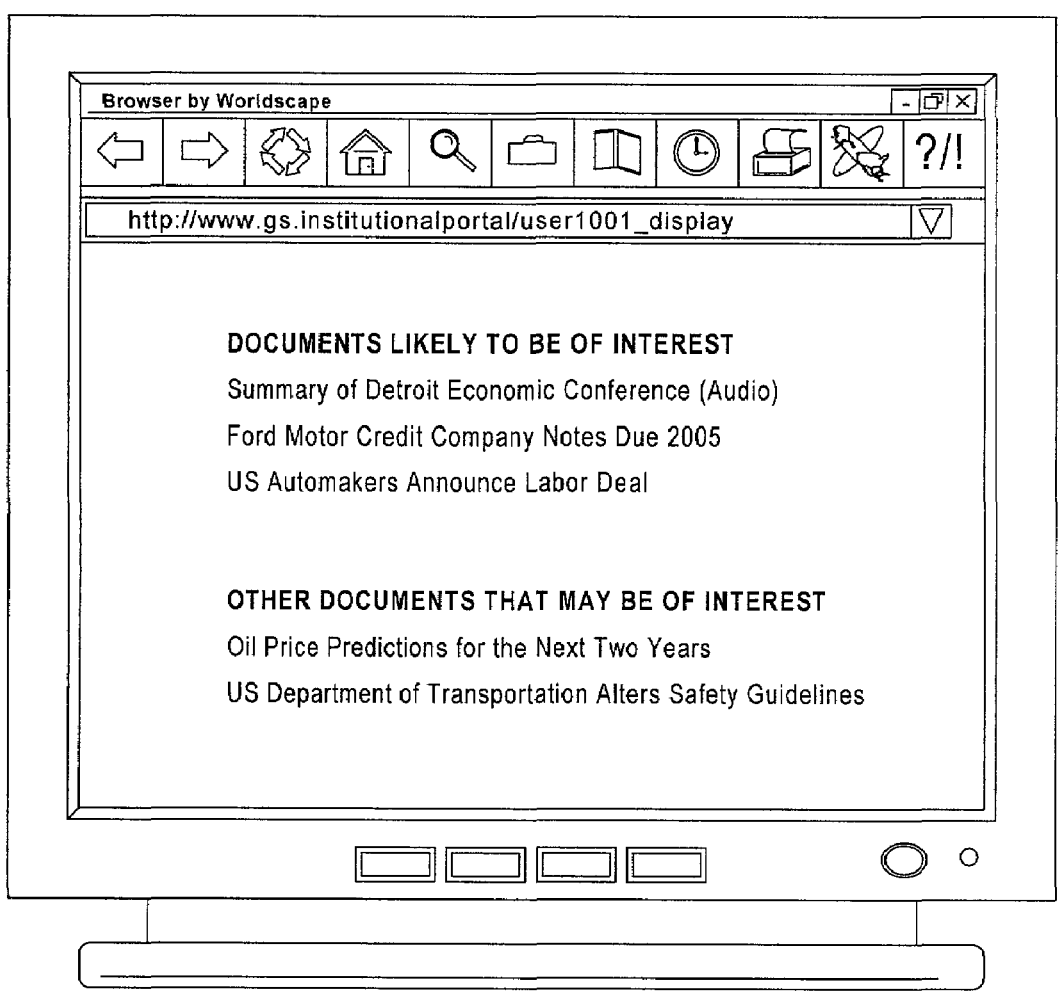
FIG. 14 illustrates a content reader display according to some embodiments of the present invention.

The first and second document sets are then separately indicated to the content reader 10 at 1308. For example, FIG. 14 illustrates a content reader display 22 according to some embodiments of the present invention. As can be seen, the first document set is displayed as "documents likely to be of interest" while the second document set is displayed as "other documents that may be of interest."

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although many of the embodiments described herein are associated with documents that contain financial information, the present invention can also be used with respect to other types of information. For example, document tags in one or more tag domains may be associated with general news documents, entertainment information, and/or products that can be purchased by customers (e.g., advertisements).

Moreover, although many embodiments include a content controller 500 that assigns and/or determines document tags, according to other embodiments these functions are instead performed by other devices (e.g., content publishers 10 and/or content readers 20 via a peer-to-peer protocol). According to another embodiment, the content controller 500 is associated with a third-party service (e.g., a service that organizes information for a number of different content providers).

Note that the relationships between documents and tag domains could be maintained in any number of ways. For example, one or more document identifiers could be stored in a tag domain database (i.e., instead of storing tag identifiers in a document database). Also note that document tags may associated with existing information protocols, such as Extensible Markup Language (XML) protocols.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A medium storing instructions adapted to be executed by a processor to perform a method of facilitating access to documents, said method comprising:
   receiving an investment research document from a content publisher;
   receiving an indication of a first document tag from the content publisher, wherein the first document tag is associated with first domain having a single-rooted, hierarchical data structure;
   automatically determining an associated tag for the document based on a rule associated with the first document tag, wherein the associated tag is associated with a second domain having a single-rooted, hierarchical data structure;
   transmitting an indication of the associated tag to the content publisher;
   receiving an indication from the content publisher, the indication indicating whether the automatically determined associated tag is appropriate;
   assigning a second document tag to the investment research document based on the associated tag and the received indication;
   retrieving the investment research document in accordance with the second document tag and at least one of: (i) a reader tag, (ii) a request tag, and (iii) an entitlement tag; and
   transmitting the retrieved investment research document to a content reader via a communication network.

2. A computer-implemented method of facilitating access to investment research documents, comprising:
   receiving an investment research document from a content publisher;
   receiving an indication of a first document tag from the content publisher, wherein the first document tag is associated with first domain having a single-rooted, hierarchical data structure;
   automatically determining an associated tag for the document based on a rule associated with the first document tag, wherein the associated tag is associated with a second domain having a single-rooted, hierarchical data structure;
   transmitting an indication of the associated tag to the content publisher;
   receiving an indication from the content publisher, the indication indicating whether the automatically determined associated tag is appropriate;
   assigning a second document tag to the investment research document based on the associated tag and the received indication;

retrieving the investment research document in accordance with the second document tag and at least one of: (i) a reader tag, (ii) a request tag, and (iii) an entitlement tag; and transmitting the retrieved investment research document to a content reader via a communication network.

3. The method of claim 2, wherein the received indication is associated with an acceptance by the content publisher of the automatically determined associated tag.

4. The method of claim 2, wherein the second document tag comprises the automatically determined associated tag.

5. The method of claim 2, wherein the investment research document comprises at least one of: (i) text information, (ii) image information, (iii) audio information, and (iv) executable information.

6. The method of claim 2, wherein the communication network comprises at least one of: (i) the Internet, (ii) an intranet, (iii) a public network, (iv) a public switched telephone network, (v) a proprietary network, (v) a wireless network, and (vi) a local area network.

7. The method of claim 2, wherein the investment research comprises at least one of: (i) financial information, (ii) financial news, (iii) information about financial events, (iv) investment information, and (v) market information.

8. The method of claim 2, wherein at least one of the tags is associated with at least one of: (i) an author, (ii) a date, and (iii) an information type.

9. The method of claim 2, wherein at least one of the tags is associated with at least one of: (i) a sector, (ii) an industry, (iii) a research type, (iv) a company, (v) an issuer, (vi) a region, (vii) a country, (viii) an investment product, (ix) a security instrument, (x) a third-party rating, (xi) a research analyst, (xii) a strategist, (xiii) an event type, (xiv) a subject, (xv) an investment style, (xvi) a market cap, (xvii) a document type, (xviii) an information value, and (xix) a currency.

10. The method of claim 2, wherein the first document tag comprises at least one of: (i) a primary tag, and (ii) a secondary tag.

11. The method of claim 2, wherein the rule is associated with at least one of: (i) a start date, (ii) an end date, (iii) antecedent tags, (iv) descendant tags, and (v) sibling tags.

12. The method of claim 2, wherein investment research document are received from a plurality of content publishers.

13. The method of claim 2, wherein said transmitting is performed via at least one of: (i) a content controller, (ii) a content reader, (iii) a personal computer, (iv) a server, (v) a portable computing device, (vi) a telephone, (vii) a Web site, and (viii) an electronic mail message.

14. An apparatus, comprising:

a processor; and a storage device in communication with said processor and storing instructions adapted to be executed by said processor to:

receive an investment research document from a content publisher;

receive an indication of a first document tag from the content publisher, wherein the first document tag is associated with first domain having a single-rooted, hierarchical data structure;

automatically determine an associated tag for the document based on a rule associated with the first document tag, wherein the associated tag is associated with a second domain having a single-rooted, hierarchical data structure;

transmit an indication of the associated tag to the content publisher;

receive an indication from the content publisher, the indication indicating whether the automatically determined associated tag is appropriate;

assign a second document tag to the investment research document based on the associated tag and the received indication;

retrieve the investment research document in accordance with the second document tag and at least one of: (i) a reader tag, (ii) a request tag, and (iii) an entitlement tag; and transmit the retrieved investment research document to a content reader via a communication network.

15. The apparatus of claim 14, wherein said storage device further stores at least one of: (i) a tag database, (ii) a document database, and (iii) a tag association database.

16. The apparatus of claim 14, further comprising:

a communication device coupled to said processor and adapted to communicate with at least one of: (i) a content publisher, (ii) a document storage device, (iii) a content controller, (iv) a content reader, and (v) a payment service.

* * * * *